Dec. 10, 1929.    A. W. FREHSE    1,738,768
FRONT WHEEL BRAKE
Filed Dec. 5, 1927
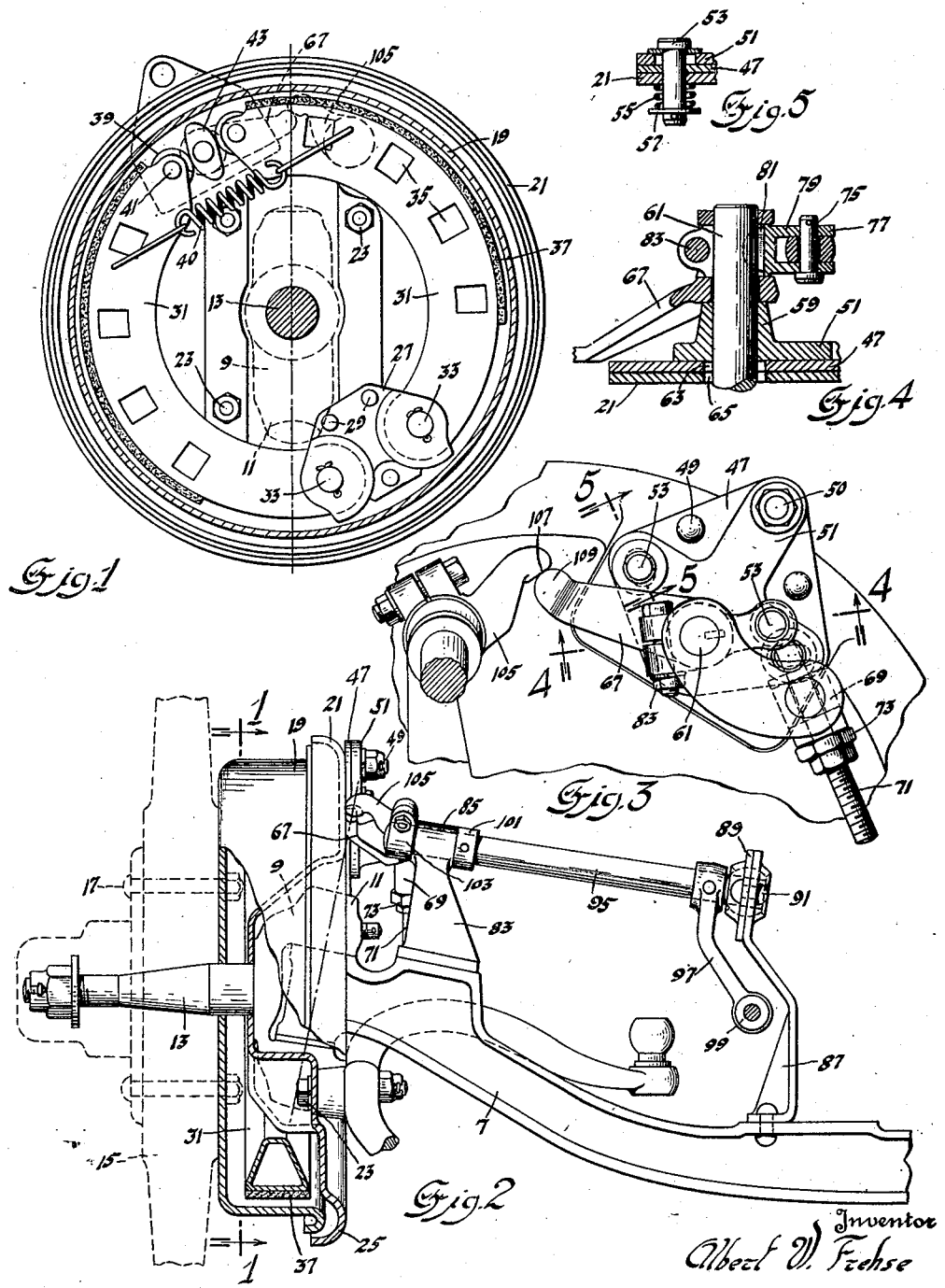
Inventor
Albert W. Frehse
By Blackmore, Spencer & Hulse
Attorneys Patented Dec. 10, 1929

1,738,768

UNITED STATES PATENT OFFICE

ALBERT W. FREHSE, OF DETROIT, MICHIGAN, ASSIGNOR TO GENERAL MOTORS CORPORATION, OF DETROIT, MICHIGAN, A CORPORATION OF DELAWARE

FRONT-WHEEL BRAKE

Application filed December 5, 1927. Serial No. 237,830.

This invention relates to brakes. It is intended for use on vehicles, more particularly for the front steering wheels of vehicles.

The invention has for its object to provide a convenient and effective brake operating mechanism which is so associated with the steering mechanism that the vehicle may be steered without interfering with the intensity of brake application.

A further object is found in the provision of simple mechanism which may be economically manufactured to secure the desired results. Other objects and advantages will be apparent from a reading of the accompanying specification and an examination of the drawing.

In the drawing:

Figure 1 is a view in elevation of the brake mechanism within the drum, as seen from the line 1—1 of Figure 2.

Figure 2 is a view in elevation of the axle and brake mechanism.

Figure 3 is a view in elevation of parts of the device.

Figure 4 is a section on line 4—4 of Figure 3, and

Figure 5 is a section on line 2—2 of Figure 3.

Referring to the drawing by reference characters, numeral 7 represents the axle. This axle is of the conventional reverse Elliot type. Pivoted to the end of the axle is a steering knuckle 9, the knuckle having upper and lower forks 11 straddling the end of the axle and pivoted thereto by the usual king pin, not shown. On the spindle 13 which forms a part of the steering knuckle is shown in dotted lines a wheel 15. To the wheel is secured by suitable fastening means 17 a brake drum 19. The brake drum is cupped as usual and its inner open end is enclosed by a plate 21, this being the plate commonly called the backing plate. This plate, when used with rear wheels, is rigidly secured to the axle housing. When the plate is used with front wheels it is rigidly secured to the knuckle as, for example, by bolts 23 shown in Figure 1. The backing plate thus partakes of the swivelling movement of the wheel and knuckle in the steering movements, but it does not rotate with the wheel about the spindle. The purpose of the backing plate in the case of both wheels is to provide an anchor for the friction band or friction shoes as the case may be; to carry the cam shaft or equivalent actuating means for expanding the band or shoes into engagement with the wheel carried rim; to house the brake members within the drum and to protect them from dirt and water. Preferably, the ends adjacent the marginal portions of the brake drum and the backing plate are outwardly bent as at 25 to better protect the brake members within the drum from exposure to dust and water.

Within the drum there is an auxiliary plate 27 secured to the backing plate by fastening means 29. This plate is bent away from the surface of the backing plate at spaced points so that shoes 31 may be anchored on pivot pins 33 carried by the backing plate and the auxiliary plate 27. It will be observed from the drawing that anchor pins 33 are positioned on either side of a diameter angularly related to a vertical diameter through the drum and that both anchor pins 33 are on one side of the vertical diameter. It will be further observed that the shoes are of equal length and that by this means the opposite adjacent ends of the shoes are spaced somewhat from the vertical line through the center of the drum and backing plate.

This invention is not concerned with the structure of the shoes nor is it concerned with a shoe brake as distinguished from a band brake. There are illustrated shoes 31 of stamped metal, these shoes being of box shape and provided with openings 35 through which access may be had to the interior for convenience in riveting to the shoes the usual lining 37. At the ends the shoes carry rollers 39 mounted on pins 41. Between the adjacent ends is a cam 43 rotatable to expand the shoes into frictional contact with the drum. Spring 40 is connected at its ends to withdraw the shoes from the drum when the actuating means is released.

The shaft 61 on which the cam is fixed passes through an enlarged opening in the backing plate 21 but is not journaled in said opening. Secured by fastening means 49 to that face of the backing plate outside the enclosure defined by the drum and backing plate is a plate member 47. Pivoted at 50 to plate 47 is a journal plate 51. Pins 53 are equally spaced from pivot bolt 50 and pass through slots in journal plate 51. These bolts are carried in the backing plate and plate 47 as shown in Figure 5. Within the enclosure defined by the drum and backing plate the pins are provided with coil springs 55 which are relatively heavy. These coil springs are in abutment with the inner surface of backing plate 21 which furnishes one abutment for the spring and also in engagement with a disc or similar member 57 suitably secured to the inner end of the bolts. These springs may at times yield to permit the journal plate to swing about its center 49, such swinging movement of plate 51 permitting the cam shaft to move bodily and thereby enabling the cam 43 to accommodate itself to movement of the shoes 31 due to self-actuation. By this means under all circumstances the pedal pressure acting upon the cam 43 is divided equally between the two shoes, this being true regardless of the unequal lining wear and relative position of the shoes due to self-actuation. New positions of the cam due to lining wear are made possible by the yielding of the springs 55, and these springs serve to hold the plate 51 and the cam shaft in such new positions of adjustment.

The journal plate 51 may be formed with a boss 59 through which is rotatably mounted the cam shaft 61. This shaft passes through enlarged openings 63 and 65 in plate 47 and in the backing plate 21 respectively. Beyond the boss 59 there is an actuating lever 67 freely mounted on the cam shaft. This lever extends in both directions from the shaft 61. In one direction it extends to a point adjacent the swivelling axis of the steering knuckle at which point it is to be engaged by the operating means. On the other side it extends to an end carrying a trunnion block 69. Through an opening in this block passes an adjusting bolt 71, the outer end of which is threaded and upon which is secured a plurality of adjusting nuts 73. The other end of the bolt is pivoted by a pin 75 between forks 77 of an arm 79 secured to the cam shaft by a key 81 and by clamping bolts 83 or other fastening means. By fixing the arm 79 and rendering arm 67 adjustable relatively to arm 79 it is possible to make brake adjustments to take care of lining wear from a position outside the drum. When the nuts 73 are adjusted on bolts 71 the cam shaft may be rotated to expand the shoes after the linings have worn and this may be done without in any way interfering with the operating mechanism including the actuating and operating lever arms.

The operating means shown in connection with the actuating means already described includes a rock shaft journaled preferably on the axle. This rock shaft is to be provided with an arm to engage arm 67 and rotate the same to apply the brake. Secured to the axle adjacent the knuckle is a bracket 83 formed with a journal bearing 85. Inwardly along the axle 7 is a second bracket 87. This bracket may have its upper end cupped to cooperate with a similar cupped plate 89, the parts secured by fastening means 91. Within the enclosure formed by the cupped members is received the axle rock shaft 95. Suitable lubricant carrying packing may surround the shaft within the cupped members. Depending from shaft 95 is an arm 97 having its end formed with an eye 99 for connection with suitable operating linkage. This linkage is not shown and forms no part of the invention. It should be noted that the arm 97 is of such length that the eye 99 to which the operating linkage is connected lies substantially in the rocking axis of the axle, which rocking of the axle is occasioned by the application of the brake to the drum. By this means the rocking of the axle under the influence of severe brake application prevents or minimizes interference with the intensity of brake application. Adjacent bearing 85 are collars 101 and 103, one on each side of the bearing. These collars hold shaft 95 from longitudinal axial movement. Rigid with shaft 95 and preferably forming a part of collar 103 is an operating arm 105. The end of this arm is flattened as at 107 where it engages the rounded surface 109 of arm 67. The center of the curved surface 109 is to be substantially above the steering knuckle and in the axis of oscillation of the steering knuckle. It will be observed that the arm 67, when moved by the rotation of rock shaft 95 turns about the center of the cam shaft 61, and that the cam shaft arm is of such length and extends in such a direction that the center of its rounded end lies substantially in the swivelling axis in all positions. At all times the center of curvature of the rounded end may be considered for practical purposes above and in the extension of the wheel swivelling axis. The departure from this condition is but very slight inasmuch as the swinging of arm 67 is through a very limited arc. Considering the wheel as being turned for steering it will be seen that arm 67 swings bodily, being carried by the knuckle, and since the center of the curved surface 109 is substantially in the swivelling axis the point of contact between 107 and 109 will move around the curved surface about said center and braking action will not be interfered with.

I claim:

1. In combination, an axle, a steering knuckle swivelled to said axle, a wheel on said steering knuckle, brake mechanism in part on the wheel and in part swivelling with the knuckle, actuating means for said brake mechanism carried by the knuckle, operated means including a rock shaft on the axle and an arm on the rock shaft engaging said actuating means, the engaging points of said members positioned for relative movement about a point substantially in the swivelling axis of the steering knuckle.

2. The invention defined by claim 1, said actuating means including a cam, a cam shaft on which said cam is mounted and an arm on said cam shaft to be engaged by said rock shaft arm.

3. The invention defined by claim 1, said actuating means including a cam, a cam shaft on which said cam is mounted and an arm on the cam shaft for engagement with said rock shaft arm, said cam shaft and rock shaft being substantially parallel and located one on each side of the axis of oscillation.

4. The invention defined by claim 1, said actuating means including a cam, a cam shaft on which the cam is mounted and an arm on the cam shaft to be engaged by said rock shaft arm, the cam shaft and rock shaft being in constant engagement substantially in the axis of oscillation of said steering knuckle.

5. In combination, an axle, a steering knuckle, a wheel thereon, brake mechanism associated with said wheel and knuckle, actuating means for said brake mechanism carried by said knuckle, operating means including a rock shaft on the axle and an arm on the rock shaft engaging said actuating means, said actuating means including a cam shaft having an arm terminating in a rounded end, the rounded surface engaged by the rock shaft arm, the center of curvature of said rounded surface being substantially in the axis of oscillation.

6. The invention defined by claim 5, said rock shaft having a longitudinal axis of rotation substantially parallel with said axle.

7. The invention defined by claim 5, together with an operating arm on said rock shaft terminating in the axis of rocking of said axle under the influence of brake application.

8. The invention defined by claim 5, said center of curvature being above the steering knuckle and substantially in the extension of the swivelling axis of the steering knuckle.

In testimony whereof I affix my signature.

ALBERT W. FREHSE.